United States Patent [19]

Gajski et al.

[11] 4,168,530

[45] Sep. 18, 1979

[54] MULTIPLICATION CIRCUIT USING COLUMN COMPRESSION

[75] Inventors: Daniel D. Gajski, Champlaign, Ill.; Chandrakant R. Vora, Devon, Pa.

[73] Assignee: Burroughs Corporation, Detroit, Mich.

[21] Appl. No.: 877,083

[22] Filed: Feb. 13, 1978

[51] Int. Cl.² ............................................. G06F 7/52
[52] U.S. Cl. ................................... 364/760; 364/757
[58] Field of Search ................ 364/760, 759, 758, 757

[56] References Cited

U.S. PATENT DOCUMENTS

| 3,515,344 | 6/1970 | Goldschmidt et al. | 364/758 X |
|---|---|---|---|
| 3,691,359 | 9/1972 | Dell et al. | 364/760 X |
| 3,761,698 | 9/1973 | Stephenson | 364/757 X |
| 3,795,880 | 3/1974 | Singh et al. | 364/758 |
| 4,041,292 | 8/1977 | Kindell | 364/760 |

*Primary Examiner*—David H. Malzahn
*Attorney, Agent, or Firm*—Edward J. Feeney, Jr.; Edmund M. Chung; Leonard C. Brenner

[57] ABSTRACT

A high speed parallel operation, multiplication circuit is provided having a multiplier multiplexor which may function in combination with a column compressor for providing a resultant product, wherein, preferably, the multiplier multiplexor has been implemented using a modified Booth's algorithm, and wherein the column compressor operates to process every column within the same propagation delay whereby every input may create an output in essentially the same propagation time, i.e., true parallel operation requiring preferably no more than an average column propagation delay time.

4 Claims, 4 Drawing Figures

MULTIPLICATION CIRCUIT USING COLUMN COMPRESSION

BACKGROUND OF THE INVENTION

This invention relates to functional components for digital data processing systems and more particularly for an arithmetic device for performing high speed multiplication.

The speed at which calculations may be performed in many computing devices is of prime consideration. This need is amplified when the computing systems are used for scientific purposes, typically requiring a large number of iterations to be performed during scientific modeling studies. In order to reduce the time required to perform calculations, it is customary to employ arithmetic devices, such as adders and multipliers, which function in the parallel-operating mode, i.e., operating upon all of the bits in a word at the same time.

As the multiplication performed by these arithmetic devices is more complicated than addition, the speed of the multipliers incorporated into a computing system to a very large extent bears upon the ultimate speed of the system.

It has been customary in many earlier computing devices to multiply by generating and then accumulating one partial product for each bit of the multiplier, thereby involving a shift operation for each bit of the multiplier. These shift operations were normally carried out serially and were quite time consuming, involving a delay time which was cumulative of the individual shift operations. Improvements to this multiplication scheme have involved skipping a string of zeros or ones. However, such improvements have not yielded a multiplier having the speed desired of the subject invention.

Other multiplication schemes have also been incorporated into earlier computing devices. These schemes have included: binary multiplication utilizing squaring techniques wherein the two operands were manipulated so that the multiplier logic need only perform two squaring functions followed by a subtraction; and pipeline binary multiplication wherein a continuous stream of operands was fed into a particular arithmetic unit where multiplication was performed on each pair of operands on successive operational cycles so that a continuous stream of products resulted. Neither of these schemes, however, provided a multiplier with a processing speed required of the subject invention.

A. D. Booth published "A Signed Binary Multiplication Technique," Quart. J. Mich., Appl. Math, Vol. 4, Part 2, 1951, which has become known as "Booth's Algorithm" and which has enabled the construction of much faster multipliers than previously available. Booth's Algorithm provides for a uniform shift method which examines two or more bits of the multiplier at the same time to determine the correct multiple of the multiplicand to be added to the partial product. This method requires no sign correction for a two's complement number, and the decoding of the multiplier may be begun from either direction. Amdal et al, U.S. Pat. No. 3,840,727 teach a pipeline implementation of Booth's Algorithm.

Another technique which has been utilized to greatly enhance multiplier speed when partial product, carry look-ahead structure is employed is "column compression." The partial product, carry look-ahead implementation for multipliers generates a matrix of partial products which must be reduced to provide the complete product. This technique is a take-off of an empherical manipulation as taught for matrix algebra in the Linear Algebra area of mathematics.

S. Singh and R. Waxman have taught a version of column compression in IBM Technical Disclosure Bulletin, Vol. 14, No. 1, June 1971, "Partial Product Array For High-Speed Multiply Using Adders For Multiple Additions." However, the circuit taught by Singh et al is serial in nature and takes 4-clock periods to achieve a complete product.

What is desired now, however is an even faster multiplication circuit than currently available from the prior art.

An objective of this invention is to provide a binary multiplication circuit for use in a digital data processing system which integrates a Booth's Algorithm scheme and a column compression scheme for performing multiplication.

A second objective of this invention is to provide such a circuit having true parallel operation of the column compression multiplication structure wherein every input to the column compressor takes the same propagation delay to get to the output.

Another objective of this invention is to provide such a circuit wherein the complete multiplication product is achieved in a one-clock period operation of the column compressor.

A further objective of this invention is to provide such a circuit being implemented in current mode logic, monolithic, large scale, integrated circuitry.

SUMMARY OF THE INVENTION

The objectives of this invention are achieved in a high speed, parallel operation, multiplication circuit which may be implemented in current mode logic, monolithic, medium scale, integrated circuitry.

A multiplier multiplexor may generate an iterative array of partial products formed from multiples of the multiplicand wherein the number of rows in the array is dependent on the number of binary ones in the multiplier. A version of Booth's algorithm may be mechanized, including, preferably, the expression of operands as the difference of two numbers both of which contain fewer binary ones than the original operand.

A column compressor may operate upon the array of partial products to compress the initial array into successively smaller arrays, reducing the number of rows until only two rows remain. Compression may be achieved for each column, and concurrently with the other columns.

A carry-look ahead adder may operate upon the remaining two rows to provide the complete product.

DESCRIPTION OF THE DRAWINGS

The advantages, principles of operation and special features of this invention may be readily understood from a reading of the following detailed description of the invention in conjunction with the accompanying drawings in which like numerals refer to like elements and in which.

DETAILED DESCRIPTION OF THE INVENTION

A high-speed binary multiplication circuit is implemented in median scale integration current mode logic. An unsigned integer multiplication circuit, FIG. 1, for handling an eight bit multiplier 108 and an eight bit binary multiplicand 106 is implemented on two I.C. chips. The multiplication scheme of this invention operates to obtain a final product 110 in essentially two operations. In the first operation, a set of addends is obtained, being the partial products of the eight bit multiplier 108 and the eight bit multiplicand 106. In the second operation the set of addends is reduced to a sum equaling the final product 110. Product 110 is a sixteen bit binary number.

Figure 1:
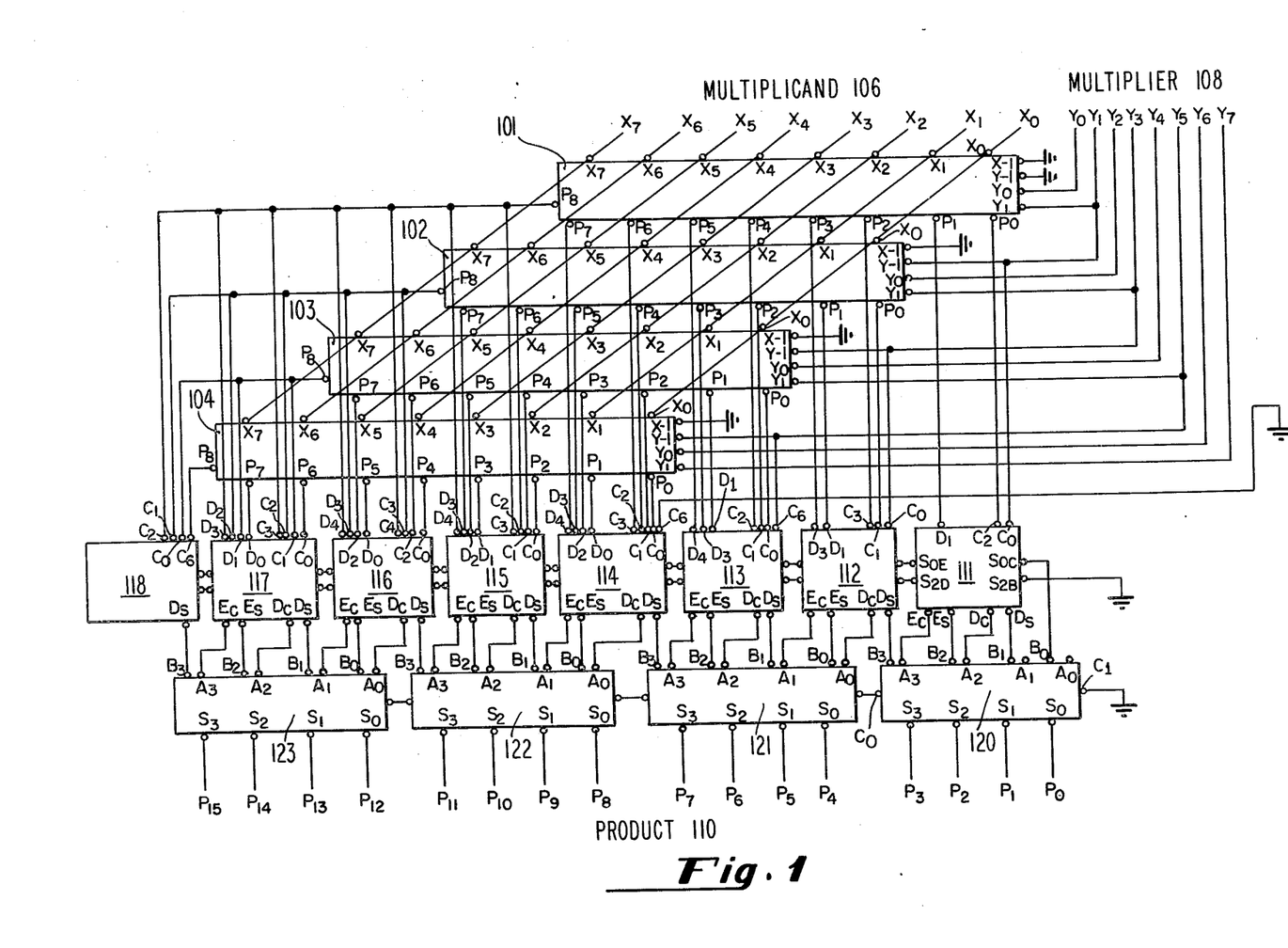
FIG. 1 is a circuit diagram of an 8 bit×8 bit multiplication circuit embodying the invention.

The numerical partial product set (matrix array) is generated in a partial product array comprising four identical multiplier multiplexor components 101, 102, 103, 104 of a type available from Burroughs Corporation, part number BCML-2M31. FIG. 1 shows the partial product array operating upon eight bit multiplicand 106 represented by $X_0$ through $X_7$, wherein $X_0$ is the least significant bit; and an eight bit multiplier 108 represented by $Y_0$ through $Y_7$, wherein $Y_0$ is the least significant bit.

Each of the multiplier multiplexors 101, 102, 103, 104 generates two-times, one-times, or zero-times the multiplicand 106, in true or complemented form corresponding to the value of the particular three bits of multiplier 108 or its inputs "Y-1," "Y0" and "Y1" inputs. The additional input "P" controls the complementation of the multiplicand 106 so that each multiplier multiplexor (MM) 101, 102, 103 and 104 may work in either the positive (where "P" input=0) or negative ("P"=1) logic. The Truth Table I below defines the output (as labeled $P_0$, $P_1$......$P_8$) from each of the multiplier multiplexors 101, 102, 103 and 104 for or given input signals on its "Y-1," "Y0" and "Y1" input terminals.

TABLE I

| "Y1" | "Y0" | "Y−1" | "$P_i$" "P"=0 | "$P_i$" "P"=1 | "$P_8$" P=0 | "$P_8$" P=1 |
|---|---|---|---|---|---|---|
| 1 | 1 | 1 | 1 | 1 | 1 | 1 |
| 1 | 1 | 0 | $X_i$ | $X_i$ | $\overline{X_7}$ | $X_7$ |
| 1 | 0 | 1 | $X_i$ | $X_i$ | $\overline{X_7}$ | $X_7$ |
| 1 | 0 | 0 | $X_{i-1}$ | $\overline{X_{i-1}}$ | $\overline{X_7}$ | $X_7$ |
| 0 | 1 | 1 | $X_{i-1}$ | $\overline{X_{i-1}}$ | $X_7$ | $\overline{X_7}$ |
| 0 | 1 | 0 | $X_i$ | $\overline{X_i}$ | $X_7$ | $\overline{X_7}$ |
| 0 | 0 | 1 | $X_i$ | $\overline{X_i}$ | $X_7$ | $\overline{X_7}$ |
| 0 | 0 | 0 | 0 | 0 | 0 | 0 |

WHERE:

$P_i = (P \oplus X_i)(\overline{Y1\,Y0}Y-1 + \overline{Y1}Y0\overline{Y-1}) + (P_i \oplus X_{i-1})\overline{Y1}Y0Y-1$ $+ \overline{(P \oplus X_{i-1})}\,Y1\overline{Y0Y-1} + \overline{(P \oplus X_i)}(Y1\overline{Y0}Y1 + Y1Y0\overline{Y-1})$ $+ Y1Y0Y-1$ $P_8 = (P \oplus X_7)(\overline{Y1Y0}Y-1 + \overline{Y1}Y0\overline{Y-1} + \overline{Y1}Y0Y-1) + \overline{(P \oplus X_7)}$ $(Y1\overline{Y0Y-1} + Y1\overline{Y0}Y-1 + Y1Y0\overline{Y-1}) + Y1Y0Y-1$ and where $0 \leq i \leq 7$.

Looking to the partial product array (MM 101-104) interconnection, FIG. 1, each multiplier multiplexor 101, 102, 103, 104 is connected for operating in parallel and has its "X0" input terminal connected in common to the X0 bit of the multiplicand 106; its "X1" input terminal connected in common to the $X_1$ bit of the multiplicand 106; its "X2" input terminal connected in common to the $X_2$ bit of the multiplicand 106; its "X3" input terminal connected in common to the $X_3$ bit of the multiplicand 106; its "X4" input connected in common to the $X_4$ bit of the multiplicand 106; its "X5" input terminal connected in common to the $X_5$ bit of the multiplicand 106; its "X6" input terminal connected in common to the $X_6$ bit of the multiplicand 106; and its "X7" input terminal connected in common to the $X_7$ bit of the multiplicand 106.

MM 101 has its "X-1" input and its "Y-1" input terminal connected to ground, while its "Y0" input terminal is connected to the $Y_0$ bit of the multiplier 106 and its "Y1" input terminal is connected to the $Y_1$ bit of the multiplier.

MM 102 has its "X-1" input connected to ground, its "Y-1" input connected to the $Y_1$ bit of the multiplier 106, its "Y0" input connected to the $Y_2$ bit of the multiplier 108 and its "Y1" input connected to the $Y_3$ bit of the multiplier 108.

MM 103 has its "X-1" input connected to ground its "Y-1" input connected to the $Y_3$ bit of the multiplier 108, its "Y0" input connected to the $Y_4$ bit of the multiplier 108 and its "Y1" input connected to the $Y_5$ bit of the multiplier 108.

MM 104 has its "X-1" input connected to ground and its "Y-1" input connected to the $Y_5$ bit of the multiplier 108, while its "Y0" input is connected to the $Y_6$ bit of the multiplier 108, and its "Y1" input is connected to the $Y_7$ bit of the multiplier 108.

The outputs from the multiplier multiplexors 101, 102, 103 and 104 are fed directly into the inputs of eight column compressor components 111, 112, 113, 114, 115, 116, 117 and 118 connected to operate in parallel and which perform the array or matrix reduction discussed above. Each of the column compressors (CC) 111-118 is an identical component of the type manufactured by Burroughs Corporation and identified by part number BCML-2M32. Each of the CC 111-118 have 16 inputs labeled "$C_0$," "$C_1$," "$C_2$," "$C_3$," "$C_4$," "$C_5$," "$C_6$," "$D_0$," "$D_1$," "$D_2$," "$D_3$," "$D_4$," "$D_5$," "$D_6$," "$S_{2B}$" and "$S_{0E}$." Each of the CC 111-118 has six outputs labeled "$S_{0C}$," "$S_{2D}$," "DS," "DC," "LS," and "EC."

CC 111 has its "$C_0$" input connected to $Y_1$ bit of multiplier 108 and its "$C_2$" input connected to the $p_0$ output of MM 101, while its "$D_1$" input is connected to the $p_1$ output of MM 101. CC 111 has its "$S_{2B}$" input connected to ground, and its "$S_{2D}$" output connected to the "$S_{2B}$" input of CC 112. CC 112 in turn has its "$S_{2D}$" output connected to the "$S_{2B}$" input of CC 113. CC 113 "$S_{2D}$" output is connected to the "$S_{2B}$" input of CC 114. Likewise CC 114 has its "$S_{2D}$" output connected to the "$S_{2B}$" input of CC 115, CC 115 has its "$S_{2D}$" output connected to the "$S_{2B}$" input of CC 116, CC 116 has its "$S_{2D}$" output connected to the "$S_{2B}$" input of CC 117, and CC 117 has its "$S_{2B}$" output connected to the "$S_{2B}$" input of CC 118.

The "$S_{0C}$" output of CC 118 is connected to the "$S_{0E}$" input of CC 117; likewise the "$S_{0C}$" output of CC 117 is connected to the "$S_{0E}$" input of CC 116, the "$S_{0C}$" output of CC 116 is connected to the "$S_{0E}$" input of CC 115, the "$S_{0C}$" output of CC 115 is connected to the "$S_{0E}$" input of CC 114, the "$S_{0C}$" output of CC 114 is connected to the "$S_{0E}$" input of CC 113, the "$S_{0C}$" output of CC 113 is connected to the "$S_{0E}$" input of CC 111, and the "$S_{0C}$" output of CC 112 is connected to the "$S_{0E}$" input of CC 111.

The "$C_0$" input of CC 112 is connected to the $Y_3$ bit of multiplier 108, while "$C_1$" input is connected to the $P_0$ output of MM 102, the "$C_3$" input is connected to the $P_2$ output of MM 101, the "$D_1$" input is connected to the $P_1$ output of MM 102, and the "$D_3$" input is connected to the $P_3$ output of MM 101.

The "$C_6$" input of CC 113 is connected to the $Y_5$ bit of multiplier 108, while the "$C_0$" input is connected to the $D_0$ output of MM 103, the "$C_1$" input is connected to the $P_2$ output of MM 102, the "$C_2$" input is connected to the $P_4$ output of MM 101, the "$D_1$" input is connected to the $P_1$ output of MM 103, the "$D_3$" input is connected to the $P_3$ output of MM 102, and the "$D_4$" input is connected to the $P_5$ output of MM 101.

The "$C_6$" input of CC 114 is tied to ground, while the "$C_0$" input is tied to the $P_0$ output of MM 104, the "$C_1$" input is tied to the $P_2$ output of MM 103, the "$C_2$" input is tied to the $P_4$ output of MM 102, the "$C_3$" input is tied to the $P_6$ output of MM 101, the "$D_0$" input is tied to the $P_1$ output of MM 104, the "$D_2$" input is tied to the $P_3$ output of MM 103, the "$D_3$" input is tied to the $P_5$ output of MM 102, and the "$D_4$" input is tied to the $P_7$ output of MM 101.

The "$C_0$" input of CC 115 is tied to the $P_2$ output of MM 104, while the "$C_1$" input is connected to the $P_4$ output of MM 103, the "$C_2$" input is connected to the $P_6$ output of MM 102, the "$C_3$" input is connected to the $P_8$ output of MM 101, the "$D_1$" input is connected to the $P_3$ output of MM 104, the "$D_2$" input is connected to the $P_5$ output of MM 103, the "$D_3$" input is connected to the $P_7$ output of MM 102, and the "$D_4$" input is connected to the $P_8$ output of MM 101.

The "$C_0$" input of CC 116 is tied to the $P_4$ output of MM 104, while the "$C_2$" input is tied to the $P_6$ output of MM 103, the "$C_3$" input is tied to the 8 output of MM 102, the "$C_4$" input is tied to the $P_8$ output of MM 101, the "$D_0$" input is tied to the $P_5$ output of MM 104, the "$D_2$" input is tied to the $P_7$ output of MM 103, the "$D_3$" input is tied to the $P_8$ output of MM 101.

The "$C_0$" input of CC 117 is tied to the $P_6$ output of MM 104, while the "$C_1$" input is tied to the $P_8$ output of MM 103, the "$C_2$" input is tied to the $P_8$ output of MM 102, the "$C_3$" input is connected to the $P_8$ output of MM 101, the "$D_0$" input is connected to the $P_7$ output of MM 104, the "$D_1$" input is connected to the $P_8$ output of MM 103, the "$D_2$" input is connected to the $P_8$ output of MM 102, and the "$D_3$" input is connected to the $P_8$ output of MM 101.

The "$C_6$" input of CC 118 is connected to the $P_8$ output of MM 104, while the "$C_0$" input is connected to the $P_8$ output of MM 103, the "$C_1$" input is connected to the $P_8$ output of MM 102, and the "$C_2$" input is tied to the $P_8$ output of MM 101.

The output from the column compressors 111–118 are connected to four identical arithmetic logic units 120, 121, 122 and 123 connected to operate in parallel. Each of the arithmetic logic units (ALU) 120–123 performs a simple addition operation. The ALU's 120–123 are commonly available and herein a type manufactured by Burroughs Corporation as identified by part number BCML-2M03. Each have inputs labeled "$A_0$," "$B_0$," "$A_1$," "$B_1$," "$A_2$," "$B_2$," and "$C_1$," while having outputs labeled "$S_0$," "$S_1$," "$S_2$," "$S_3$," and "$C_0$." The outputs of the ALU's 120-123 connected in parallel define the bits of the 16-bit product 110 which is the final product out of the multiplier.

ALU 120 is shown in FIG. 1 as being connected as a carry ripple adder. This was done for simplicity of representation. However, in the principal embodiment ALU 120 is connected as a carry-look-ahead adder with special carry look generator. ALU 120, FIG. 1, has its "$C_1$" input connected to ground, its "$B_0$" input connected to the "$S_{0C}$" output of CC 111, its "$B_1$" input connected to the "DS" output of CC 111, its "$A_2$" input connected to the "DC" output of CC 111, the "$B_2$" input connected to the "ES" output of CC 111, the "$A_3$" input connected to the "EC" output of CC 111, and "$B_3$" input connected to the "DS" output of CC 112.

The "$C_0$" output of ALU 120 is connected to the "$C_1$" input of ALU 121, as is the "$C_0$" output of ALU 121 connected to the "$C_1$" input of ALU 122, and the "$C_0$" output of ALU 122 connected to the "$C_1$" input of ALU 123.

The "$A_0$" input of ALU 121 is connected to the "DC" output of CC 112, while the "$B_0$" input is connected to the "ES" output of CC 112, the "$A_1$" input is connected to the "EC" output of CC 112, the "$B_1$" input is connected to the "DS" output of CC 113, the "$A_2$" input is connected to the "DC" output of CC 113, the "$B_2$" input is connected to the "ES" output of CC 113, the "$A_3$" input is connected to the "EC" output of CC 113, and the "$B_3$" input is connected to the "DS" output of CC 114.

The "$A_0$" input of ALU 122 is connected to the "DC" output of CC 114, while the "$B_0$" input is connected to the "ES" output of CC 114, the "$A_1$" input is connected to the "EC" output of CC 114, the "$B_1$" input is connected to the "DS" output of CC 115, the "$A_2$" input is connected to the "DC" output of CC 115, the "$B_2$" input is connected to the "ES" output of CC 115, the "$A_3$" input is connected to the "EC" output of CC 115, and the "$B_3$" input is connected to the "DS" output of CC 116.

As for ALU 123, its "$A_0$" input is connected to the "DC" output of CC 116, while its "$B_0$" input is connected to the "ES" output of CC 116, the "$A_1$" input is connected to the "EC" output of CC 116, the "$B_1$" input is connected to the "DS" output of CC 117, the "$A_2$" input is connected to the "DC" output of CC 117, "$B_2$" input is connected to the "ES" output of CC 117, "$A_3$" input is connected to the "EC" output of CC 117, and the "$B_3$" input is tied to the "DS" output of CC 118.

The final product 110 contains sixteen bits labeled $P_0$ through $P_{15}$ wherein the "$S_0$" output of ALU 120 is $P_0$ bit of the product 110. The "$S_1$" output of ALU 120 is the $P_1$ bit of the product 110. The "$S_2$" output and "$S_3$" output of ALU 120 are the $P_2$ and $P_3$ bits of the product 110, respectively. The "$S_0$," "$S_1$," "$S_2$," and "$S_3$" outputs of ALU 121 are the $P_4$, $P_5$, $P_6$, and $P_7$ bits of the product 110, respectively. The "$S_0$," "$S_1$," "$S_2$," and "$S_3$" outputs of ALU 122 are the $P_8$, $P_9$, $P_{10}$ and $P_{11}$ bits of the product 110, respectively. The "$S_0$," "$S_1$," "$S_2$," and "$S_3$" outputs of ALU 123 are the $P_{12}$, $P_{13}$, $P_{14}$, and $P_{15}$ respectively, bits of the product 110.

As stated above, the multiplier multiplexor section implements Booth's Algorith. This algorithm is based on a property of a binary number to be represented as a difference of two numbers of special form. Assume that multiplier 108 is given in the form:

$$Y = \sum_{i=0}^{n-1} Y_i 2^i = Y_{n-1} Y_{n-2} \ldots Y_1 Y_0$$

Then Y can be represented as the difference $$Y = U - V, \quad U = \sum_{i=0}^{n} u_i 2^i, \quad V = \sum^{n-1} v_i 2^i$$

where $u_i = |y_i - y_{i-1}|$, if $y_i - y_{i-1} < 0$, and 0 otherwise; and $v_i = |y_i - y_{i-1}|$ if $y_i - y_{i-1} > 0$ and 0 otherwise. For example if $Y = 0111111100$, then Y can also be stated as: $Y = 1000000000 - 0000000100$. Thus a string of given 1's are replaced by only two 1's, thereby easing calculation routines.

The multiplicand X in the example above, must be added to the partial product for every 1 in U and subtracted for every 1 in V. However, additions and subtraction alternate. Extending the Booth's algorithm to three consecutive binary positions $Y_{i-1}$ and $Y_{i+1}$. The following Table II may be easily obtained:

TABLE II

| $Y_{i-1}$ | $Y_i$ | $Y_{i+1}$ | OPERATION |
|---|---|---|---|
| 0 | 0 | 0 | Add zero to partial product |
| 1 | 0 | 0 | Add multiplicand to partial product |
| 0 | 1 | 0 | Add multiplicand to partial product |
| 1 | 1 | 0 | Add 2 times multiplicand to partial product |
| 0 | 0 | 1 | Subtract 2 times multiplicand from partial product |
| 1 | 0 | 1 | Subtract multiplicand from partial product |
| 0 | 1 | 1 | Subtract multiplicand from partial product |
| 1 | 1 | 1 | Subtract zero from partial product |

Thus, the operations described in Table II above are made possible with the implementation of the hard wiring interconnection between the components MM 101, 102, 103 and 104 described above.

Figure 2:
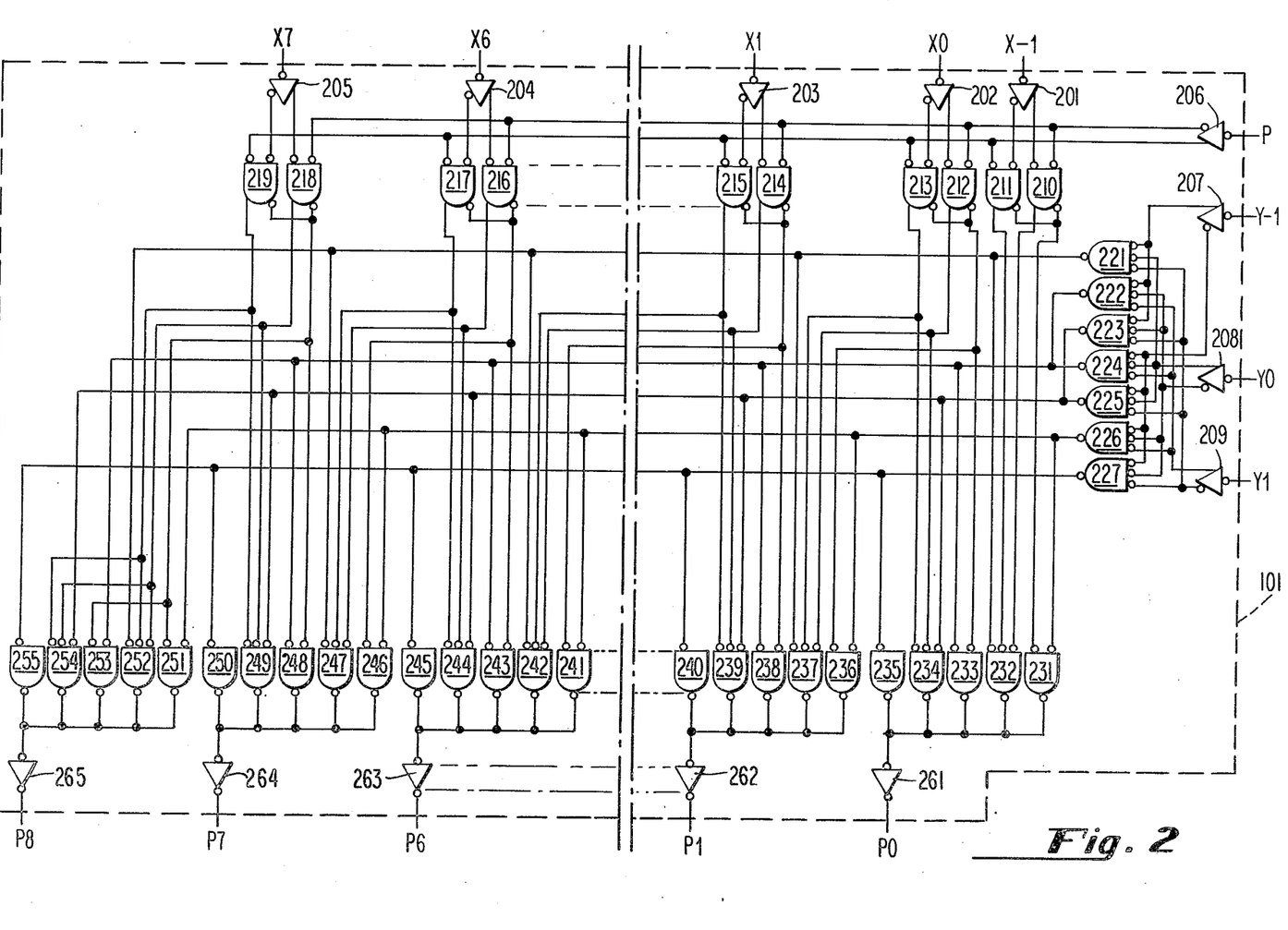
FIG. 2 presents a circuit diagram of a single multiplication multiplexer shown in broken representation as to duplication of identical elements, a plurality of which multiplication multiplexors are found in the circuit of FIG. 1.

Multiplier multiplexor's 101, 102, 103 and 104 described above are shown in detail as a single unit in FIG. 2. FIG. 2 shows MM 101 to have inputs "$X_0$" through "$X_7$," as well as "X-1," inputs "Y-1," "Y0" and a "Y1," as well as the "P" input for determining complement as described above. The eight outputs are labeled $P_0$ through $P_8$. This multiplier multiplexor circuit 101 contains a duplication of circuitry for handling the plurality of inputs in parallel and as such FIG. 2 shows the circuitry interconnections with a break away portion of that part of the circuitry directly connected to the processing of input bits "$X_2$" through "$X_5$" and the output bits $P_2$ through $P_5$. Connected to each of the inputs "X-1" and "$X_0$" through "$X_7$" is an inverter driver having an inverted input and an inverted output as well as a complementary, non-inverted output. As to the portion of the circuitry shown in FIG. 2, input "X-1" is connected to the inverted input of driver 201, while the "$X_0$" input is connected to the inverted input of a second driver 202, and the input "$X_1$" is connected to the inverted input of a third driver 203, input "$X_6$" is connected to the inverted input of a fourth driver 204, and input "$X_7$" is connected to the inverted input of a fifth driver 205.

Inverter drivers identical to the driver 201 are connected to the remaining inputs of the circuit 101, whereby the "P" input is connected to the inverted input of a sixth driver 206, the "Y-1" input is connected to the inverted input of seventh driver 207, the "Y0" input is connected to the inverted input of a eighth driver 208 and the "Y1" input is connected to the inverted input of a ninth driver 209.

Connected to the output of each of the drivers 201 through 205 is a pair of inverting NAND gates wherein NAND gates 210, 211 are connected to the inverter 201, NAND gates 212, 213 are tied to the driver 202, NAND gates 214, 215 are connected to the driver 203, NAND gates 216, 217 are connected to the driver 204, and NAND gates 218, 219 are connected to the driver 205. Each of the NAND gates 210 through 219 has an inverted and a non-inverted (complementary) output. The inverted output from the drivers 201, 202, 203, 204, and 205 are each connected to an inverted input of their respective interconnected NAND gates 211, 213, 215, 217 and 219, respectively. The non-inverted output of the drivers 201, 203, 204, and 205 are each connected to an inverted input of their respective NAND gates 210, 212, 214, 216 and 218 respectively. The inverted output from the driver 206 is connected to a second inverted input of each of the gates 210, 212, 214, 216, and 218, while the non-inverted output from the driver 206 is connected to a second inverted input of the gates 211, 213, 215, 217 and 219.

Seven inverted input NAND gates 221, 222, 223, 224, 225, 226, and 227 are connected in parallel to the output of the drivers 207, 208, and 209. The non-inverting output of driver 207 is connected to a first inverted input to the gates 221, 222, and 223. The inverted output of the driver 207 is connected to a first inverted input to the gates 224, 225, 226 and 227. The non-inverting output from the driver 208 is connected to a second inverted input to the gates 221, 224 and 225, while the inverted output from the driver 208 is connected to a second inverting input on the gates 222, 223, 226 and 227. The non-inverting output from the driver 209 is connected to a third inverting input on the gates 222, 224 and 226 while inverting output from the driver 209 is connected to a third inverting input on the gates 221, 223, 225, and 227.

Connected to the output from NAND gates 210 through 219 and NAND gates 221 through 227 are a plurality of three inverted input NAND gates connected in parallel with groups of five gates having their outputs connected in common, these gates being numbered 231 through 255.

The inverting output from the gates 210 and 211 are connected in common to a first inverted input to the gate 231. The inverting output from the gates 212 and 213 are connected in common to a first inverted input of each of the gates 233 and 236. The non-inverting output from the gate 210 is connected to a first inverting input of the gate 232. The non-inverting output from the gate 211 is connected to a second inverting input of the gate 232, while the non-inverting output from the gate 212 is connected to a first inverting input to the gate 234 and a first inverting input of the gate 237. The non-inverting output from the gate 213 is connected to a first inverting input of the gate 234 and a first inverting input of the gate 237.

The inverting output from the gates 214 and 215 are connected in common and to a first inverting input of the gate 238 as well as to an additional gate out of FIG. 2. The non-inverting output from the gate 214 is connected to a first inverting input of the gate 239 as well as to an additional gate out of the figure. The non-inverting output from the gate 215 is connected to a second inverting input of the gate 239 as well as to an additional gate out of the figure.

The inverting output from the gates 216 and 217 are connected in common to a first inverting input of the gate 243 as well as a first inverting input of the gate 246. The non-inverting output from the gate 216 is connected to a first inverting input of the gate 244 and a first inverting input of the gate 247. The non-inverting output from the gate 217 is connected to a second inverting input of the gate 244 and a second inverting input of the gate 247.

Gates 218 and 219 have their inverting inputs tied in together and to a first inverting input of the gate 248 and a first inverting input of each of the gates 251 and 253. The non-inverting output from the gate 218 is connected to a first inverting input of the gate 249 and a first inverting input of each of the gates 252 and 254. The non-inverting output from the gate 219 is connected to a first inverting input of the gate 249 as well as a second inverting input of each of the gates 249 and 252 and a second inverting input of the gates 254.

The inverting output from the gate 221 is connected to a third inverting input of the gate 232, as well as to each of a third inverting input of the gate 237, an inverting input of the gate 242, an inverting input of the gate 247, and an inverting input of the gate 252, as well as, an inverting input of corresponding gates out of the figure.

The inverting output from the gates 222 and 224 is connected together and to a second inverting input of each of the gates 233, 238, 243, 248, as well as gate 253 and corresponding gates out of the figure.

The inverting output from the gates 223 and 225 are connected in common to a third inverting input of each of the gates 234, 237, 244, 249 and 254, as well as corresponding gates out of figure. The inverting output from the gate 226 is connected to a second inverting input of each of the gates 231, 236, 241, 246 and 251, as well as corresponding gates out of the figure. The inverting output from the gate 227 is tied to an inverting input of each of the gates 235, 240, 245, 250 and 255, as well as corresponding gates out of the figure.

The gates 231, 232, 233, 234, and 235 have their inverting outputs connected in common and to an inverting input of a driver 261. The inverting output from each of the gates 236, 237, 238, 239 and 240 are connected in common and to an inverting input of a driver 262. The inverting output from each of the gates 241, 242, 243, 244 and 245 are connected in common to an inverting input of a driver 263; while the inverting output from each of the gates 246, 247, 248, 249 and 250 are connected in common and to an inverting input of a driver 264; and the inverting outputs from each of the gates 251, 252, 253, 254, and 255 are tied together and to an inverting input of a driver 265. The drivers 261, 262, 263, 264, and 265 each have inverting outputs and have corresponding counter parts for the circuitry out of the figure. The inverting output from the driver 261 forms the most significant bit $p_0$ out of the multiplier multiplexor circuit; while the inverting output from the driver 262 is the output bit $p_2$; the inverting output from the driver 263 forms the output bit $p_6$; the inverting output from the driver 264 forms the output bit $p_7$; and the inverting output from the driver 265 forms the output bit $p_8$. Output bits $p_2$, $p_3$, $p_4$, and $p_5$ they are accounted for from similar circuitry out of the figure.

Figure 3A:
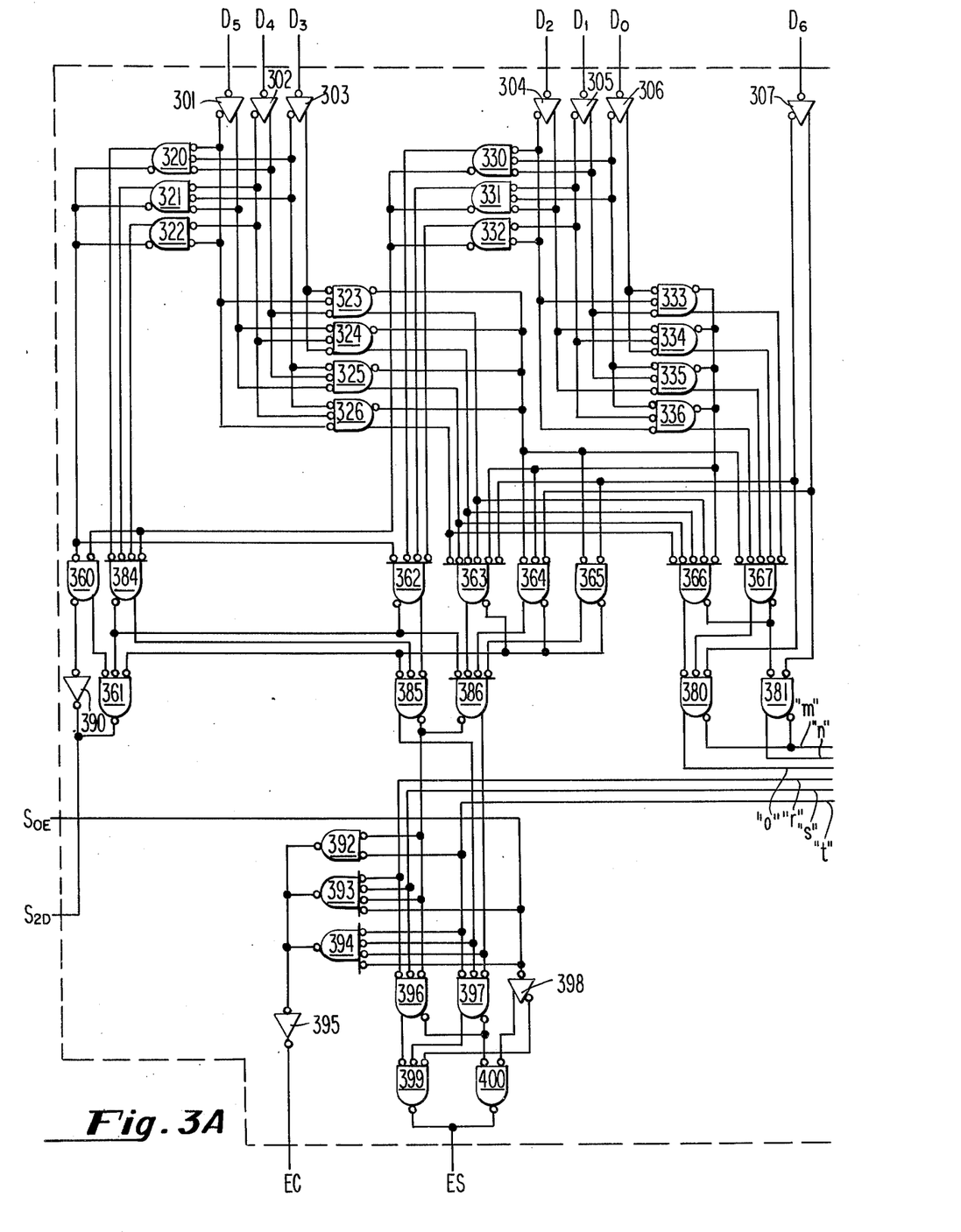
FIGS. 3A and 3B comprise a circuit diagram of a single column compressor, a plurality of which column compressors are found in the circuit of FIG. 1.
Figure 3B:
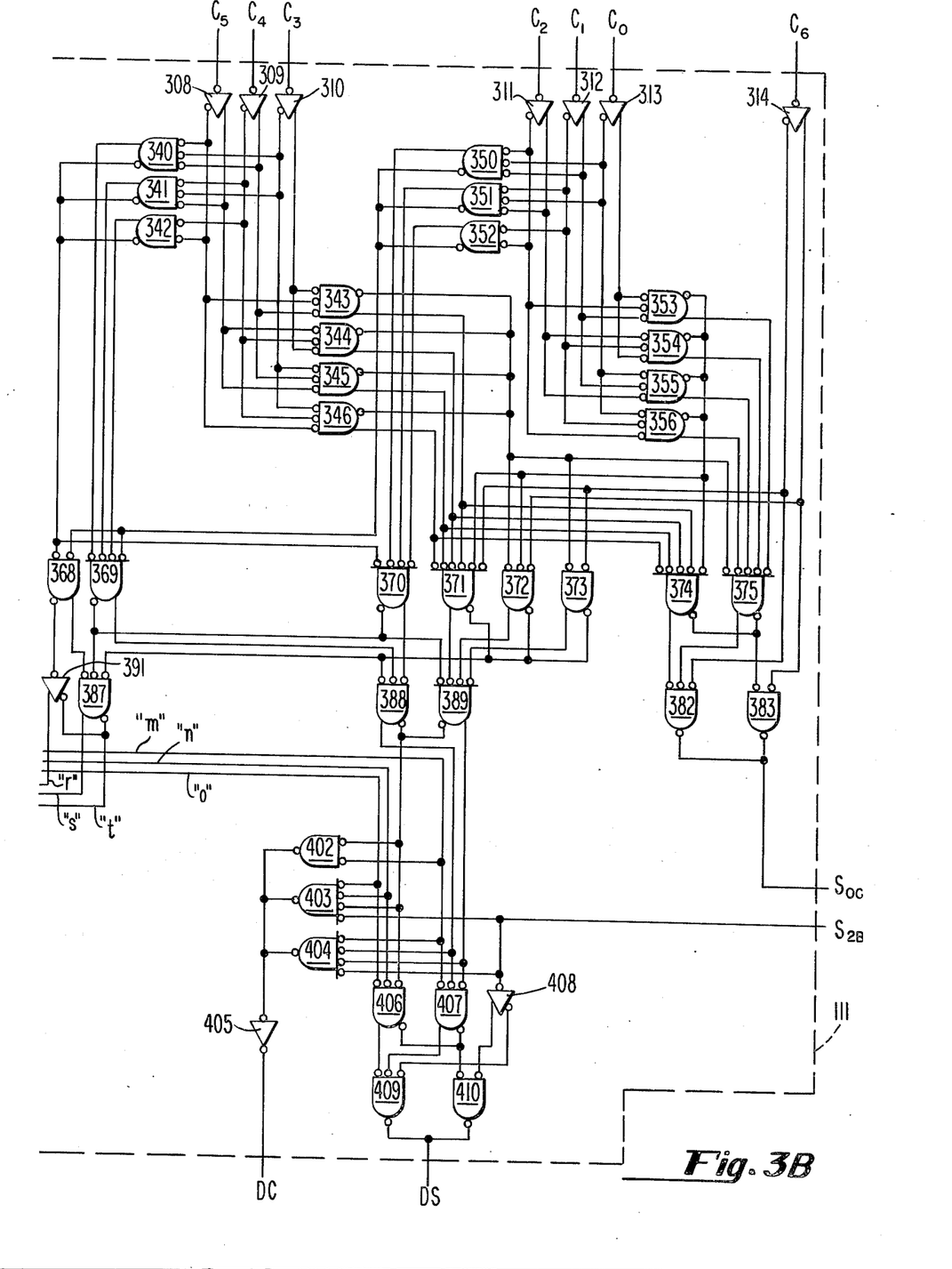

The column compressors 111 through 118 of FIG. 1 are each identically constructed as shown in detail in FIGS. 3A, and 3B. CC 111 through 118 operate in parallel to perform a manipulation similar to the following explanation which includes an illustration in Table III.

The avoidance of excessive carry-propagation time is implemented by column compression where carries are not allowed to propagate until the very last moment. Assuming that the sum of 6 numbers is to be calculated. This partial product array may, as an illustration, be represented by the array in Section "a" of the Table III.

Multiple addition as implemented by column compression is achieved by summing independently along each column, i.e. counting the number of 1's in column. Since each column's sum is up to 7, the binary result is contained in three bits as shown in Section "b" of the Table III. As an example, the third least significant bit's column contains six 1's. These 1's are added up and expressed in binary form, on a diagonal line beginning from the bottom upwardly to the right, ending directly under the third most significant column of Section "a." Here a binary "110" is written equaling 6. Similarly the number of ones in each of the other columns is added and written binarily on a diagonal. A second reduced "array" is written in Section "b" of the Table III as a three-row array.

This operation is performed again and again until the array is reduced to only two rows which can be operated upon by a simple adder component. With the illustration of Table III the very next reduction produces a two-row array, Section "c." A simple addition provides the output, Section "d." (112+143+60+198+255+100+30=898)

TABLE III

| | | $2^7$ | $2^6$ | $2^5$ | $2^4$ | $2^3$ | $2^2$ | $2^1$ | $2^0$ | |
|---|---|---|---|---|---|---|---|---|---|---|
| "a" | | 0 | 1 | 1 | 1 | 0 | 0 | 0 | 0 | (112) |
| | | 1 | 0 | 0 | 0 | 1 | 1 | 1 | 1 | (143) |
| | | 0 | 0 | 1 | 1 | 1 | 1 | 0 | 0 | (60) |
| | | 1 | 1 | 0 | 0 | 0 | 1 | 1 | 0 | (198) |
| | | 1 | 1 | 1 | 1 | 1 | 1 | 1 | 1 | (255) |
| | | 0 | 1 | 1 | 0 | 0 | 1 | 0 | 0 | (100) |
| | | 0 | 0 | 0 | 1 | 1 | 1 | 1 | 0 | (30) |
| "b" | | | 1 | 0 | 0 | 0 | 0 | 0 | 0 | |
| | 1 | 0 | 0 | 0 | 0 | 1 | 0 | 1 | | |
| | 0 | 1 | 1 | 1 | 1 | 1 | 1 | 0 | | |
| "c" | | 0 | 0 | 0 | 1 | 1 | 1 | 0 | 0 | 1 | 0 |
| | 0 | 1 | 1 | 0 | 0 | 0 | 1 | 0 | 0 | 0 | |
| "d" | 0 | 1 | 1 | 1 | 0 | 0 | 0 | 0 | 1 | 0 | (898) |

A circuit diagram showing the detailed circuitry for the identical column compressors 111, 112, 113, 114, 115, 116, 117, and 118 is shown in FIGS. 3A and 3B as represented by a single one of the column compressors, CC 111. A plurality of inverting output inverter drivers, FIG. 3A and 3B, comprise a portion of the CC 111 and are connected, one each, to each of the inputs "$E_0$," "$D_1$," "$D_2$," "$D_3$," "$D_4$," "$D_5$," "$D_6$," "$C_0$," "$C_1$," "$C_2$," "$C_3$," "$C_4$," "$C_5$," and "$C_6$" of the CC 111. Each of these drivers 301–304 have both an inverting output and a non-inverting output as well as an inverting input. Column compressor 111 input "$D_5$" is connected to the input of the driver 301; while the "$D_4$" input is connected to the input of the driver 302; the "$D_3$" input is tied to the input of driver 303; the "$D_2$" input is connected to the input of driver 304; the "$D_1$" input is connected to the input of driver 305; the "$D_0$" input is connected to the input of driver 306; the "$D_6$" input is connected to the input of driver 307; the "$C_5$" input is tied to the input of driver 308; the "$C_4$" input is tied to the input of driver 309; the "$C_3$" input is tied to the input of driver 310; the "$C_2$" input is tied to the input of driver 311; the "$C_1$" input is tied to the input of driver 312; the "$C_0$" input is tied to the input of driver 313; and the "$C_6$" input is tied to the input of driver 314.

The inverting output of driver 301 is connected to an inverting input of each of NAND gates 321 and 322 as well as additional NAND gates 323 and 326. The non-inverting output from the driver 301 is connected to another inverting input of the gate 321 as well as an inverting input of another gate 324 and an inverting input of another gate 325.

The inverted output from driver 302 is connected to another inverting input of each of the gates 321 and 322 as well as the gates 324 and 326. The non-inverted output from the driver 302 is connected to an inverting input of another gate 320 and an inverting input of each of the gates 323 and 325.

The inverted output from driver 303 is connected to an inverting input of the gate 320 and an inverting input of the gate 321 as well as an inverting input of each of the gates 325 and 326. The non-inverted output from the driver 303 is connected to another inverting input of the gate 323 and another inverting input to gate 324.

As shown in FIG. 3A drivers 304, 305 and 306 are connected to gates 330, 331, 332, 333, 334, 335, and 336 respectively in an identical configuration as the drivers 301, 302 and 303 are connected to the gates 320, 321, 322, 323, 324, 325 and 326 as described above, the drivers 304, 305, 306 and 301, 302, and 303 all being of the same type, and the gates 320 through 326 and 330 through 336 all being of the same type.

Referring to FIG. 3B, the drivers 308, 309 and 310 have identical respective interconnections with respect to additional gates 340, 341, 342, 343, 344, 345 and 346 as the drivers 301, 302 and 303 and the gates 320 through 326 described above. Likewise, the drivers 311, 312 and 313 are identically interconnected to additional gates 350, 351, 352, 353, 354, 355 and 356.

As with the initial bank of gates 320 through 326, 330 through 336, 340 through 346, and 350 through 356, a second bank of like gates is utilized to perform a second step of compression. Included in this second bank are the gates 360, 361, 362, 363, 364, 365, 366, 367, 368, 369, 370, 371, 372, 373, 374 and 375. The non-inverted output from the gate 320 is connected to an inverting input to the gate 361, while the inverted output from the gate 320 is connected in common with the inverting output from the gate 321 and to the inverted output from the gate 322 as well as to an inverting input to the gate 360 and an inverting input to the gate 362. The non-inverted output from the gate 321 is connected to an inverting input to the gate 361. The non-inverted output from the gate 322 is connected to a second inverting input to the gate 361.

The gates 360 and 361 also each have an additional inverting input thereof connected in common and to the inverted output of the gates 330, 331 and 322 which are connected also in common.

The gates 323, 324, 325 and 326 each have their inverted outputs connected in common to an inverting input of each of the gates 364, 365 and 367. While, the non-inverted output from the gate 323 is connected to an inverting input of each of the gates 363 and 366. The non-inverted output from the gate 324 is connected to another inverting input of the gate 363 and another inverting input to the gate 366. The non-inverted output from the gate 325 is connected to another input to the gate 363 as well as another inverting input to the gate 366. The non-inverted output from the gate 326 is connected to another inverting input of the gate 363 and another inverting input to the gate 366.

The gates 333, 334, 335 and 336 each have the inverted output connected in common and connected to another inverting input to the gates 363 and 366, and to another inverting input of the gate 364. The non-inverted output from the gates 333, 334, 335 and 336 are each connected to a different inverted input of the gate 367.

Driver 307 has its inverted output connected to an inverting input on each of the gates 363, and 365 as well as to an inverting input on another gate 380. The non-inverted output of the driver 307 is connected to another inverting input of the gate 364 as well as an inverting input to another gate 381.

Gate 380 has another of its inverting inputs connected to the non-inverted output from the gate 366 and a third inverting input connected to the non-inverted output from the gate 367. A second inverting input of the gate 381 is connected to the inverted output from both gates 366 and 367 which have been connected together.

FIG. 3B shows an identical circuit interconnection for the gates 340, 341, 342, 343, 344, 345, 346, 350, 351, 352, 353, 354, 355, and 356 and the gates 368, 369, 370, 371, 372, 373, 374, and 375, respectively, as described above in connection with the gates 320 through 326, 330 through 336, and 360 through 367. Additional gates 382 and 383 shown in FIG. 3B correspond to the gates 380 and 381, FIG. 3A, described above. Specifically, the gate 382 has a first inverting input connected to the non-inverted output of the gate 374, a second inverting input connected to the non-inverted output of the gate 375 and a third inverting input connected to the inverted output of the driver 314 which is also connected to an inverting input of both the gate 373 and the gate 371. Gate 383 has an inverting input connected to the inverted output of the gate 374 and the inverted output of the gate 375. A second inverting input of the gate 383 is connected to the non-inverted output of the driver 314 which is also connected to an inverting input to the gate 372.

The gates 380, 381, 382, and 383 continue the compression process and are joined by gates 384, 385, 386, 387, 388 and 389 and drivers 390 and 391. The gate 380 has an inverting input connected to the non-inverted output of the gate 360 and a second inverting input connected to the inverted output of the gate 361, the inverted output of the gate 362, as well as, an inverting input of the gate 386. Gate 384 has a third inverting input connected to an inverting input of the gate 385 and the inverted output of the gates 363, 364 and 365 which are connected in common. The gate 385 has a second inverting input connected to the non-inverted output of the gate 361, while a third inverting input is connected to the non-inverted output of the gate 363. Gate 386 has an inverting input connected to the inverted output of the gates 361 and 363 which are connected in common. Another inverting input of the gate 386 is connected to the non-inverted output of the gate 363 while a third inverting input to the gate 386 is connected to the non-inverted output of the gate 364. A fourth inverting input of the gate 386 is connected to the non-inverted output of the gate 365.

The driver 391 and the gates 387, 388 and 389 are connected in an identical respective configuration with the outputs from gates 368 through 363 as described above with respect to the driver 390 and the gates 384, 385 and 386 regarding interconnection with the outputs from the gates 360 through 365.

An inverted output from the driver 390 and an inverted output from the gate 384 are connected in common to provide the "$S_{2D}$" output for the CC 111 circuit. The inverted output from the gate 382 and the inverted output from the gate 383 are connected in common to become the output "$S_{OC}$" for the CC 111 circuit.

Column compressor 111 input "$S_{OE}$" is connected to an inverting input of another gate 398 connected in common. The non-inverted output from the driver 390 is connected to a second inverting input of the gate 393 and an inverting input of another gate 396. The inverted output from the driver 391 is connected in common to the inverted output of the gate 337, and to an inverting input of another gate 392, another inverted input to the gate 394 and an inverted input to the gate 397. The non-inverted output from the gate 387, is connected to an inverting input to the gate 393 and another inverting input of the gate 396.

Gate 385 has its non-inverted output connected to another inverting input of the gate 394 and an inverting input of another gate 397. Gate 386 has its non-inverted output connected to another inverting input of the gate 394 and another inverting input of the gate 397. The inverted output of the gates 385 and 386 are connected in common and to an inverting input of another gate 392, another inverting input of the gate 393 and another inverting input of the gate 396.

Gate 380 has its non-inverted output connected to an inverting input of another gate 403 as well as to an inverting input of another gate 406. Gate 380 and gate 381 have their inverted outputs connected together and to an inverting input of another gate 402 as well as an inverting input of another gate 404 and an inverting input of another gate 407. The non-inverted output from the gate 380 is tied to another inverting input to the gate 403 and another inverting input to the gate 406.

The gates 388 and 389 have their inverted outputs connected in common in addition to being connected to an inverting input of the gate 402, another inverting input of the gate 403 and another inverting input of the gate 406. Gate 388 has its non-inverted output connected to another inverting input of the gate 404 and another inverting input of the gate 407. Gate 389 has its non-inverting output connected to another inverted input of the gate 404 and another inverting input of the gate 407.

Column compressor 111 has its "$S_{2B}$" input connected to another inverting input of the gate 403 and another inverting input of the gate 404 as well as an inverting input of another gate 408.

The inverted outputs from the gate 392, the gate 393 and the gate 394 is connected in common to an inverting input to another driver 395. The inverted output from the driver 395 is the "$E_C$" output from CC 111. The inverted outputs from the gates 402, 403 and 404 are connected in common and to an inverting input of a driver 405. Driver 405 has its inverted output as the "$D_C$" output from the CC 111. Gates 396 and 397 have their non-inverted outputs connected to separate inverting inputs of a gate 399. Gate 399 also has a third inverting input connected to an inverted output from a driver 398. Another gate 400 has an inverting input connected to the inverted output from the gates 396 and 397 which have been connected in common. The non-inverted output from the driver 398 is connected to a second inverting input to the gate 400. Gate 399 and 400 have their inverted outputs connected together to form the "ES" output of the CC 111.

Gates 406 and 407 each have their non-inverted output connected to a different inverting input of a gate 409. The inverted outputs from these gates 406 and 407 are connected in common to an inverting input of another gate 410. Gate 410 has a second inverting input connected to the non-inverted output from the driver 408. The inverted output of the driver 408 is also connected to a third inverting input to the gate 409. The gates 409 and 410 have their inverted outputs connected together to become the "$D_S$" output for the CC 111.

The circuit of this invention provides a very high speed multiplication circuit which operates at speeds apparently greater than were previously available. Moreover, this invention has combined a new design for a multiplication multiplexor with a new design for a column compressor. The new design for the multiplication multiplexor includes implementation of a modified Booth's Algorithm which operates faster than previously available. The new column compressor design reduces seven inputs to two outputs in approximately a single average column propagation delay time. No pipeline schemes are utilized and no latches between processing elements are needed.

Since many changes could be made in the above-described apparatus, and many different embodiments of this invention could be made without departing from the scope thereof, it is intended that all matter contained in the above description were shown in the accompanying drawings shall be interpreted as illustrative and shall not be taken in the limiting sense.

What is claimed is:

1. A binary multiplication circuit comprising:
 array generating means for operating upon a binary multiplier and a binary multiplicand for generating a partial product array, through parallel operating circuitry, in a single operation time, said array generating means including a plurality of identical multiplication multiplexors each having correspondingly identical inputs thereof connected to the same bits of said multiplicand input and having other inputs thereof connected to differing bits of said multiplier input, said plurality of multiplication multiplexors including an implementation of Booth's Algorithm;
 compressing means, being responsive to said array generating means for compressing said array generated, wherein compression of each column of the array is accomplished in parallel within a single operation time, said compressing means including a plurality of identical column compressors connected to the outputs of said plurality of multiplication multiplexors in a parallel operating configuration, said column compressors operating in unison within a single operation time, said plurality of column compressors each performing a parallel compression of a plurality of inputs into two outputs and said plurality of column compressors each including a plurality of gates each gate having at least one inverting input and an inverted and a non-inverted output; and means for providing a final product by an addition operation upon the compressed array from said compressing means, said final product providing means being connected to the output of said compressing means.

2. The circuit of claim 1 wherein said plurality of multiplication multiplexors each includes a plurality of gates, each gate having an inverting input and an inverted and a non-inverted output.

3. The circuit of claim 2 wherein said plurality of multiplier multiplexors is four and wherein said plurality of column compressors is eight.

4. The circuit of claim 3 wherein said addition final product means includes four arithmetic logic units connected in a parallel operating configuration to the outputs of said eight column compressors, said four arithmetic logic units providing a sixteen bit final product.

* * * * *